United States Patent [19]

Schenk

[11] Patent Number: 4,720,367
[45] Date of Patent: Jan. 19, 1988

[54] METHOD OF AN APPARATUS FOR DEEP DRAWING OF THERMOPLASTIC FOIL

[76] Inventor: Bernd Schenk, Eibenweg 7, D-7517 Waldbronn, Fed. Rep. of Germany

[21] Appl. No.: 852,284

[22] Filed: Apr. 15, 1986

[30] Foreign Application Priority Data

Apr. 15, 1985 [DE] Fed. Rep. of Germany ....... 3513399

[51] Int. Cl.$^4$ ...................... B29C 51/20; B29C 51/10
[52] U.S. Cl. .................................... 264/545; 264/553; 425/326.1; 425/451; 425/454; 425/504
[58] Field of Search ...................... 264/542, 545, 553; 425/326.1, 451, 454, 532, DIG. 5, 504

[56] References Cited

U.S. PATENT DOCUMENTS

| | | | |
|---|---|---|---|
| 3,003,187 | 10/1961 | Schaich | 264/542 |
| 3,196,513 | 7/1965 | Parma | 425/454 |
| 3,238,565 | 3/1966 | Jacobs | 425/308 |
| 3,454,693 | 7/1969 | Crenshaw | 425/327 |
| 3,543,344 | 12/1970 | Hunt | 425/DIG. 5 |
| 3,552,545 | 12/1970 | Overdiep | 425/377 |
| 3,580,773 | 5/1971 | Schneider et al. | |
| 3,699,199 | 10/1972 | Macduff | 264/542 |
| 4,025,250 | 5/1977 | MacMillan | 425/DIG. 5 |
| 4,381,276 | 4/1983 | Hegler et al. | |

FOREIGN PATENT DOCUMENTS

| | | | |
|---|---|---|---|
| 1454922 | 4/1974 | Fed. Rep. of Germany . | |
| 71716 | 1/1960 | France | 264/545 |
| 48-4937 | 2/1973 | Japan | 264/550 |
| 747434 | 4/1956 | United Kingdom . | |

*Primary Examiner*—Jan H. Silbaugh
*Assistant Examiner*—James Bartholomew
*Attorney, Agent, or Firm*—Karl F. Ross; Herbert Dubno

[57] ABSTRACT

A method of operating a vacuum-forming machine and the machine which operates by this method, in which once the mold halves are closed on the foil webs for vacuum drawing and fusion of the vacuum drawn container halves come together to produce a hollow article, the mold halves move at the velocity of the web to a lower position spaced from the upper position by a distance sufficient to permit cooling of the molded articles. A spring or other force-storing element is stressed during this movement so that when the mold opens at the lower position, it is driven upwardly at a substantially higher velocity to return to the starting position.

8 Claims, 9 Drawing Figures

METHOD OF AN APPARATUS FOR DEEP DRAWING OF THERMOPLASTIC FOIL

CROSS REFERENCE TO RELATED APPLICATION

This application is related to the commonly owned copending application Ser. No. 852,282 based upon German application No. P 35 13 388.0 filed Apr. 15, 1985.

FIELD OF THE INVENTION

My present invention relates to a method of and to an apparatus for the production of hollow articles from a synthetic resin thermoplastic foil by deep drawing or vacuum drawing, utilizing mold halves each of which has a cavity juxtaposed with a thermoplastic web and which can draw that web into the cavity to form a respective container half. When the mold halves are forced together, the perimeters of the container halves thus formed are fused together and the resulting container or hollow article can be filled or otherwise processed.

BACKGROUND OF THE INVENTION

The vacuum forming or deep drawing of synthetic resin or thermoplastic foil webs into mold cavities of respective mold halves, and the use of such mold halves to fuse the container halves thus formed together when the mold halves are pressed toward one another is described, inter alia, in Austrian Pat. No. 284 430.

In the device of this patent, the mold halves are movable back and forth in a horizontal plane located below the extrusion press from which the thermoplastic foil is extruded.

During the article-forming processes and the associated cooling time, the extrusion press must be brought to standstill and the means for carrying off the finished article must likewise be halted. The latter means is again operated once the mold halves are spread apart to release the finished article, whereupon the extrusion press can be restarted to permit a sufficient foil portion to be introduced between the mold halves.

This, naturally, requires intermittent drives for the extrusion press and the means for carrying off the vacuum-formed articles.

Furthermore, there is a tendency when the foil is constituted by a pair of foil webs or strips, for the strips to come together during any standstill of the extrusion press and this, of course, is highly undesirable because the two webs may fuse together and give rise to defects in the products made. Consequently it is desirable to operate to greatest possible extent with a continuous output from the extrusion press, i.e. uninterrupted feed of the material from the latter.

The disadvantage of this approach, of course, is that an accumulation of the extruded foil is found upstream of the mold halves while the latter are closed or operative to form respective container halves for an article. In some cases this accumulation cannot be handled readily and backed up material must be removed before operation is again effective.

Discontinuous withdrawal of the foil from the extruder may result in a backup at the extruder with blockage of the extruder nozzles or thickening of the extruded foil at various locations, also to the detriment of the uniformity and quality of the finished products.

OBJECTS OF THE INVENTION

It is, therefore, the principal object of the present invention to provide an improved method of making hollow articles by vacuum forming or deep drawing of a thermoplastic foil and, more specifically, an improved method of operating a deep drawing or vacuum-forming machine, whereby the aforedescribed drawbacks are obviated.

Another object of this invention is to provide an improved apparatus for making such hollow bodies which is free from the disadvantage of earlier intermittently operating systems and yet is also devoid of the disadvantage of prior art systems in which the extrusion press operates continuously.

Yet another object of this invention is to provide a process and apparatus for the purposes described which completely eliminate the need for intermittent drive of the extrusion and foil-movement systems and, moreover, which does not give rise to any accumulations of material above the mold halves.

SUMMARY OF THE INVENTION

These objects and others which will become apparent hereinafter are attained, in accordance with the present invention in a method of producing synthetic resin containers, also referred to herein as hollow articles, in which the mold halves after they have been placed in a starting position at a relatively upstream location, cooperate with the respective thermoplastic webs from the extruder located above this location and vacuum-form the respective container halves from these webs, the mold halves then pressing toward one another flatly to fuse perimeters of the container halves together and thereby form the hollow article.

According to the invention, once the mold halves are pressed together, they are moved at the same speed as the continuously moving foil which is continuously discharged from the extruder and continuously moved past the vacuum-forming machine, the mold halves consequently moving with the web to a downstream location at a distance from the upstream location which is sufficient to allow the molded article to cool to a self-supporting object.

At the downstream location, the mold halves are opened and a force-storing element which has been stressed during the movement of the mold halves with the foil, at least in part gives up its stored energy by driving the mold halves back to the upstream location at a speed greater than the speed of the foil and hence the speed at which the mold halves moved with the foil against which they were clamped in the previous stage. The apparatus of the present invention thus includes an energy-stored device for this purpose. The spring can be a coil spring or a gas-pressure spring.

More specifically, a method of operating a deep drawing machine for the production of hollow articles from a thermoplastic foil, comprises the steps of:

(a) extruding a pair of webs of the thermoplastic foil and displacing the webs in juxtaposition at a foil-feed speed;

(b) downstream of the extruding of the thermoplastic foil, engaging each of the webs with a respective mold half formed with a cavity adapted to shape the respective web into a respective container half by vacuum drawing, and vacuum drawing the respective web into the respective cavity to form the respective container half;

(c) pressing, at a relatively upstream location of the mold halves, the mold halves together to fuse the webs together around the respective cavities and thereby bond the container halves together and form a respective hollow article therefrom;

(d) displacing the mold halves with the webs while the mold halves are pressed together from the relatively upstream location at the foil-feed speed over a distance selected in accordance with the rate of cooling of the article to a relatively downstream location;

(e) stressing means comprising at least one force-storage element by the movement of the mold halves over the distance;

(f) spreading the mold halves apart to release the article from the mold at the relatively downstream location;

(g) with force generated at least in part by the force-storage element, displacing the mold halves back to the relatively upstream location at a velocity greater than the speed of the foil; and (h) repeating steps (b) through (g) sequentially.

The apparatus can therefore comprise:

means for extruding a pair of webs of the thermoplastic foil and displacing the webs in juxtaposition at a foil-feed speed;

a pair of mold halves downstream of the extruding means each engageable with one of the webs and provided with a respective cavity adapted to shape the respective web into a respective container half by vacuum drawing;

means for pressing, at a relatively upstream location of the mold halves, the mold halves together to fuse the webs together around the respective cavities and thereby bond the container halves together and form a respective hollow article therefrom;

means for displacing the mold halves with the webs while the mold halves are pressed together from the relatively upstream location at the foil-feed speed over a distance selected in accordance with the rate of cooling of the article to a relatively downstream location; and means operatively connected with the mold halves and comprising at least one force-storage element stressed by the movement of the mold halves over the distance for displacing the mold halves back to the relatively upstream location at a velocity greater than the speed of the foil upon the spreading of the mold halves apart to release the article at the relatively downstream location.

Advantageously the element is a spring, e.g. a compression or tension spring, having a spring characteristic adapted to generate the greater velocity displacement of the mold halves to the relatively upstream location and such that it stores energy during movement of the mold halves to the relatively downstream location and releases stored energy upon displacement of the mold halves to the relatively upstream location.

The means for displacing the mold halves includes an electric motor and a threaded spindle assembly connected to the electric motor and acting on the mold halves.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

The basic parts of the apparatus of the invention as illustrated in FIGS. 1a–1f and FIGS. 2 and 2b, is an extruder or extrusion press 1 which extrudes two thermoplastic webs or strips 3 and 4 from a double-mouth die downwardly in a direction x at a foil feed speed represented at $v_1$.

Figure 1:
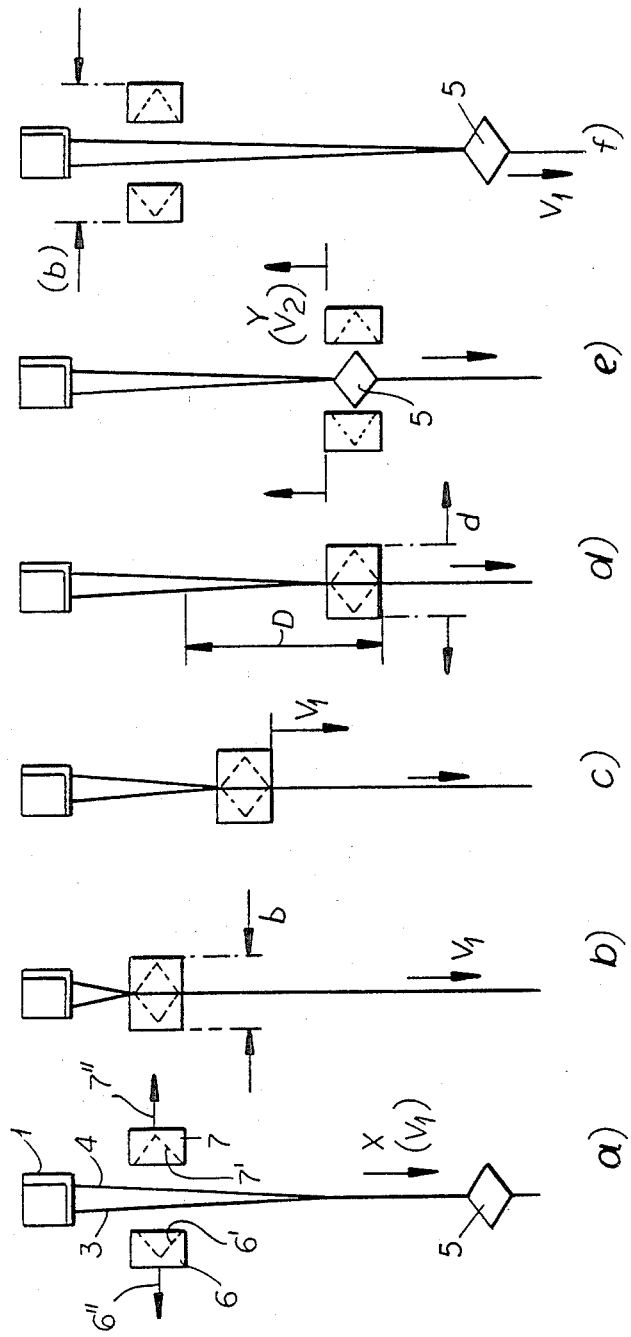
FIGS. 1a–1f are diagrams illustrating sequential positions of the mold halves during the formation of containers in accordance with the invention.

At an upstream location as best seen in FIG. 1a, a pair of mold halves 6 and 7 are juxtaposed with the respective webs 3 and 4 and have respective cavities 6', 7' form suction boxes or the like adapted to generate suction in the mold cavities so that the respective webs will be drawn into these cavities to form respective container halves. The mold halves 6 and 7, therefore, can be considered vacuum-forming or deep-drawing mold halves. Cavities 6', 7' are also connected to means (not shown in detail) represented by arrows 6'' and 7'' which function to overcome the formed suction and separate the mold halves.

The double-mouth die of the extruder 1 has its opening spaced apart so that at least in the region of the upstream starting location, the webs 3 and 4 are similarly spaced apart and, concurrently with closure of the mold (FIG. 1b) and is represented by the arrow b, the mold halves are pressed together during the vacuum forming of the container halves or subsequently thereto and press the two webs together around the container halves which are formed on the cavities 6', 7' to fuse the webs together in this region. Upon closure against the foil web, which moves continuously at the speed represented at $v_1$, the mold is likewise moved at the speed $v_1$ as shown in FIG. 1c.

The distance D by which the mold is displaced to its relatively downstream position (FIG. 1d) is determined by the cooling characteristics of the finished container 5 and is at least equal to a distance necessary to permit cooling of the foil to the point at which the foil is self supporting. In the downstream position the mold is opened as represented by the arrows d and the finished article 5 is liberated (FIG. 1e) and can continue to move at the velocity $v_1$ (compare FIGS. 1e and 1f) while the mold halves are returned at least in part by force stored in a force-storing element in the direction of arrow Y, i.e. the opposite direction at the higher velocity $v_2$. When the mold reaches its upper location again, the process is repeated.

The velocity $v_2$ is preferably much greater than the velocity $v_1$ and can be a multiple, e.g. 4 or 5 times this velocity or even greater.

Figure 2A:
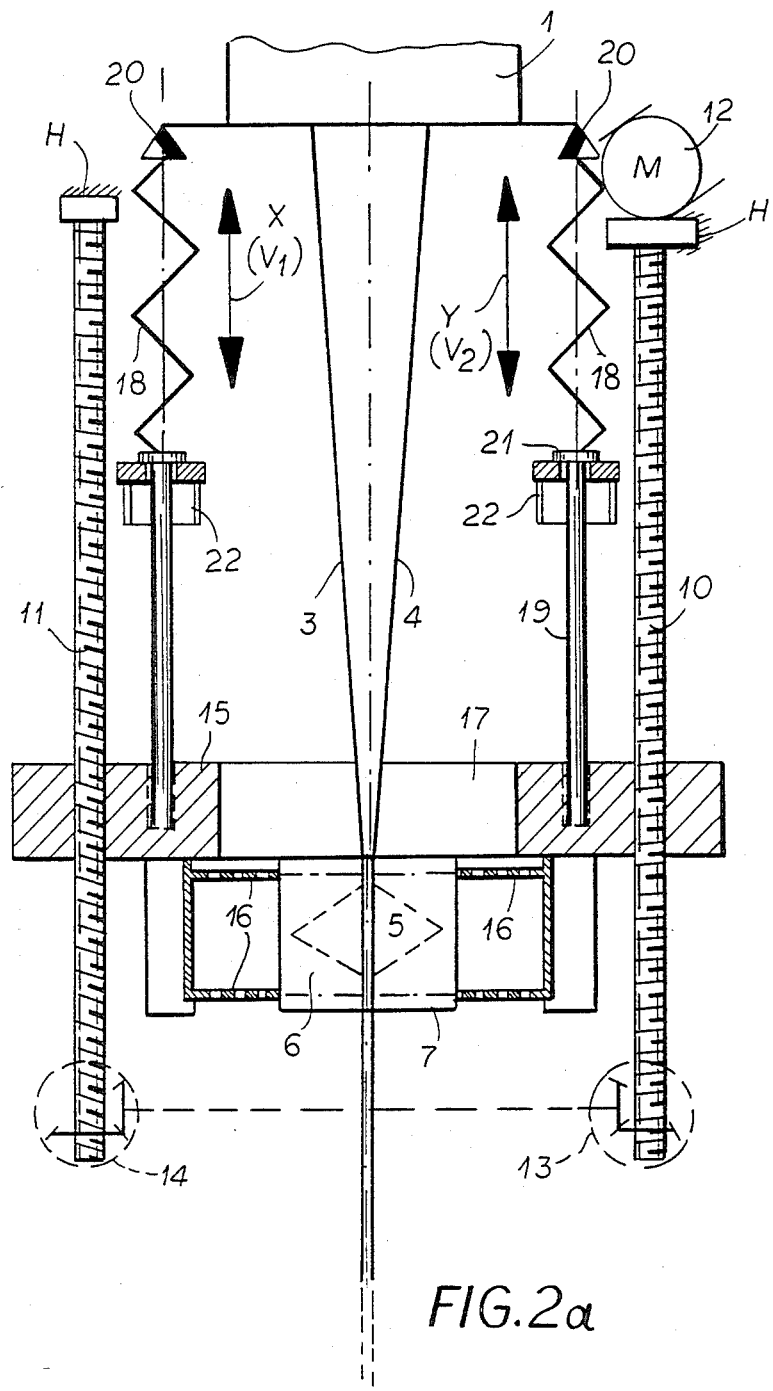
FIG. 2a is a diagrammatic cross section showing the position of the mold halves at the point of opening in which a tension spring has been stressed.
Figure 2B:
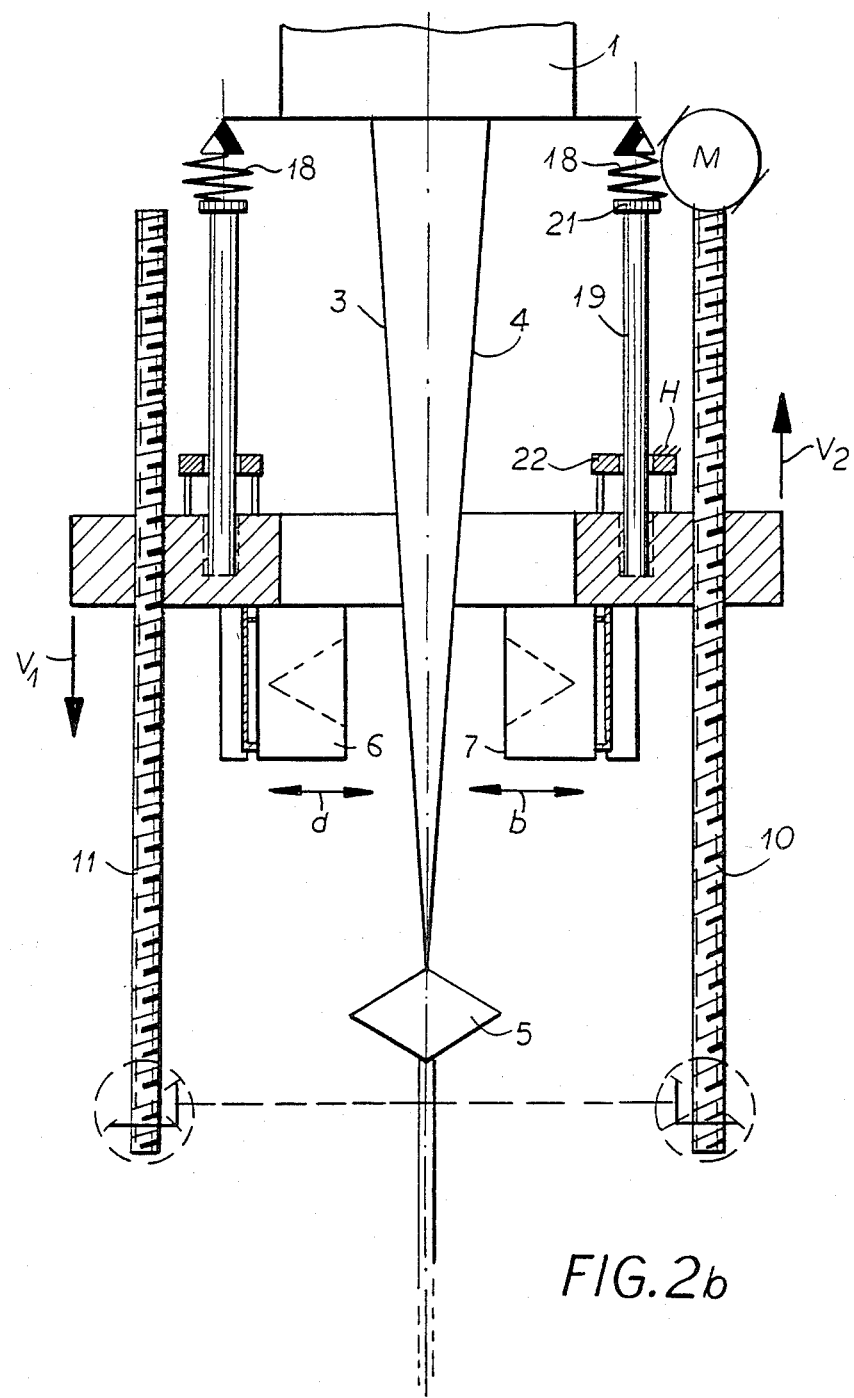
FIG. 2b shows the apparatus of FIG. 2a in a similar view but upon return of the mold halves to their starting position for the formation of a new article.

FIGS. 2a and 2b shows the apparatus in somewhat greater detail in which the force-storing element is a tension spring. FIG. 2a shows the apparatus in its position in which the finished article is about to be released and the tension elements have been mechanically stressed.

Here the mold halves 6 and 7 are still closed against one another and have fused the two container halves into the finished article 5 which is cooled sufficiently to be self-supporting. The mold has upon being displaced with the foil webs at the velocity $v_1$ by a pair of threaded spindles 10 and 11 driven by an electric motor 12 and coupled together by a transmission shown diagrammatically to be constituted by bevel gear assemblies 13 and 14.

The spindles 10 and 11 are threaded into a support plate 15 and can be mounted on a housing or foundation common to the extrusion press represented at 1, the housing being represented at H in FIG. 2a.

The support plate 15, which can be raised and lowered, carries the mold halves 6 and 7 which are thereby moved vertically with the plate 15 in the directions of arrows X and Y. The mold halves 6 and 7 can be moved on the plate 15 by the spindle drives 16 horizontally in the directions of the arrows b and d previously mentioned, preferably with a drive system of the type described in the aforementioned copending application which is hereby incorporated by reference.

A pair of springs 18 are here shown to be coupled to the plate 15 by rods 19 which can be threaded into the plate 15 and the assembly of the rods 19, a guide sleeve 22 and an abutment nut 21 by which the spring is anchored to the respective rod, allows pretension of the spring to be adjusted to take up the weight of the plate 15 and any additional stress applied by the motor 12 via the threaded spindles 10 and 11 in displacing the plate 15 along with the foil. The spindles 10 and 11 can have shallow pitch threads so that the force of the springs, when the motor drive is cut off, is sufficient to displace the plate 15 upwardly into its upper position shown in FIG. 2b at a higher velocity $v_2$. The energy required for this accelerated movement upwardly is provided by the springs although it can be augmented by the motor if desired.

Figure 3:
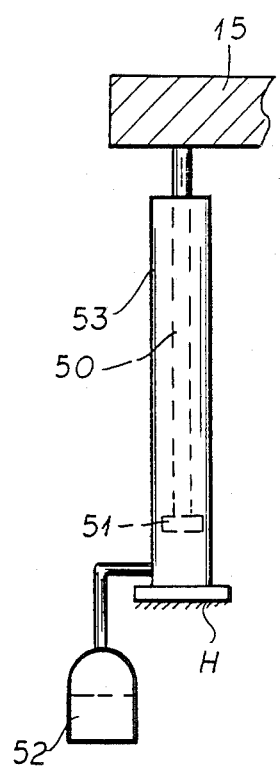
FIG. 3 is a sectional view in part and in elevation in part showing a gas-pressure spring which can be used in accordance with the invention.

While a spring energy accumulator is shown to be used in FIGS. 2a and 2b, FIG. 3 shows a gas spring used for this purpose. In this case, the gas spring is a pressure spring consisting of a cylinder 50 in which a piston 51 is displaceable to compress a gas cushion in an accumulator 52 as liquid is displaced from the compartment 53 of the cylinder.

When the motor force is relieved, the gas cushion drives the piston upwardly to move the plate 15 into its uppermost position.

The abutment 21 can limit the movement of the plate 15 and thus of the mold halves to the distance D mentioned previously from their uppermost positions and the abutment 21, when it reaches the guide ring 22 of the respective rod 19 can establish the end position of the plate 15 and thus the maximum extension of tension springs 18, as well as the maximum stored spring energy. In the position shown in FIG. 2a, the mold 6, 7 can open, whereupon the plate springs upwardly at the velocity $v_2$, the motor 12 being de-energized (see FIG. 2b). The guide ring 22 thus can establish the upper position as well.

Another advantage of the system of the invention beyond those discussed in connection with the objects of the invention, is that the motor used to displace the mold halves can be dimensioned to be of lesser size than one which would have to return the mold halves to the upper position at a higher velocity than the descent velocity which is aided by the weight of the plate 15 and the mold halves.

I claim:
1. A method of operating a deep-drawing machine for the production of hollow articles from a thermoplastic foil, comprising the steps of:
 (a) extruding a pair of webs of said thermoplastic foil and displacing said webs in juxtaposition at a foil-feed speed;
 (b) downstream of the extruding of said thermoplastic foil, engaging each of said webs with a respective mold half formed with a cavity adapted to shape the respective web into a respective container half by vacuum drawing, and vacuum drawing the respective web into the respective cavity to form the respective container half;
 (c) pressing, at a relatively upstream location of said mold halves, said mold halves together to fuse said webs together around the respective cavities and thereby bond said container halves together and form a respective hollow article therefrom;
 (d) displacing said mold halves with said webs while said mold halves are pressed together from said relatively upstream location at said foil-feed speed over a distance selected in accordance with the rate of cooling of said article to a relatively downstream location;
 (e) stressing means comprising at least one force-storage element by the movement of said mold halves over said distance;
 (f) spreading said mold halves apart to release said article from said mold at said relatively downstream location;
 (g) with force generated at least in part by said stressing of said force-storage element, displacing said mold halves back to said relatively upstream location at a velocity greater than said speed of said foil; and
 (h) repeating steps (b) through (g) sequentially.

2. An apparatus for producing hollow articles from a thermoplastic foil, comprising:
 means for extruding a pair of webs of said thermoplastic foil and displacing said webs in juxtaposition at a foil-feed speed;
 a pair of mold halves downstream of said extruding means each engageable with one of said webs and provided with a respective cavity adapted to shape the respective web into a respective container half by vacuum drawing;
 means for pressing, at a relatively upstream location of said mold halves, said mold halves together to fuse said webs together around the respective cavities and thereby bond said container halves together and form a respective hollow article therefrom;
 means for displacing said mold halves with said webs while said mold halves are pressed together from said relatively upstream location at said foil-feed speed over a distance selected in accordance with the rate of cooling of said article to a relatively downstream location; and
 means operatively connected with said mold halves and comprising at least one force-storage element stressed by the movement of said mold halves over said distance for displacing with force generated at least in part by said stressing of said force-storage element said mold halves back to said relatively upstream location at a velocity greater than said speed of said foil upon the spreading of said mold halves apart to release said article at said relatively downstream location.

3. The apparatus for producing hollow articles from a thermoplastic foil defined in claim 2 wherein said element is a spring having a spring characteristic adapted to generate the greater velocity displacement of said mold halves to said relatively upstream location and such that it stores energy during movement of said mold halves to said relatively downstream location and releases stored energy upon displacement of said mold halves to said relatively upstream location.

4. The apparatus for producing hollow articles from a thermoplastic foil defined in claim 3 wherein said spring is a compression spring.

5. The apparatus for producing hollow articles from a thermoplastic foil defined in claim 3 wherein said spring is a tension spring.

6. The apparatus for producing hollow articles from a thermoplastic foil defined in claim 3 wherein said means for displacing said mold halves includes an electric motor and a threaded spindle assembly connected to said electric motor and acting on said mold halves.

7. A method of operating a deep-drawing machine for the production of hollow articles from a thermoplastic foil, comprising the steps of:
(a) extruding a pair of webs of said thermoplastic foil and displacing said webs in juxtaposition at a foil-feed speed;
(b) downstream of the extruding of said thermoplastic foil, engaging each of said webs with a respective mold half formed with a cavity adapted to shape the respective web into a respective container half by vacuum drawing, and vacuum drawing the respective web into the respective cavity to form the respective container half;
(c) pressing, at a relatively upstream location of said mold halves, said mold halves together to fuse said webs together around the respective cavities and thereby bond said container halves together and form a respective hollow article therefrom;
(d) displacing said mold halves with said webs while said mold halves are pressed together from said relatively upstream location at said foil-feed speed over a distance selected in accordance with the rate of cooling of said article to a relatively downstream location;
(e) stressing a spring by the movement of said mold halves over said distance;
(f) spreading said mold halves apart to release said article from said mold at said relatively downstream location;
(g) with force generated at least in part by said stressing of said spring element, displacing said mold halves back to said relatively upstream location at a velocity greater than said speed of said foil; and
(h) repeating steps (b) through (g) sequentially.

8. An apparatus for producing hollow articles from a thermoplastic foil, comprising:
means for extruding a pair of webs of said thermoplastic foil and displacing said webs in juxtaposition at a foil-feed speed;
a pair of mold halves downstream of said extruding means each engageable with one of said webs and provided with a respective cavity adapted to shape the respective web into a respective container half by vacuum drawing;
means for pressing, at a relatively upstream location of said mold halves, said mold halves together to fuse said webs together around the respective cavities and thereby bond said container halves together and form a respective hollow article therefrom;
a threaded spindle assembly for displacing said mold halves with said webs while said mold halves are pressed together from said relatively upstream location at said foil-feed speed over a distance selected in accordance with the rate of cooling of said article to a relatively downstream location; and
means operatively connected with said mold halves and comprising a spring element stressed by the movement of said mold halves over said distance for displacing with force generated at least in part by said stressing of said spring element said mold halves back to said relatively upstream location at a velocity greater than said speed of said foil upon the spreading of said mold halves apart to release said article at said relatively downstream location.

* * * * *